May 12, 1931.  E. G. DOOLEY  1,804,752
APPARATUS FOR HEATING AND STERILIZING TOWELS
Filed June 13, 1928
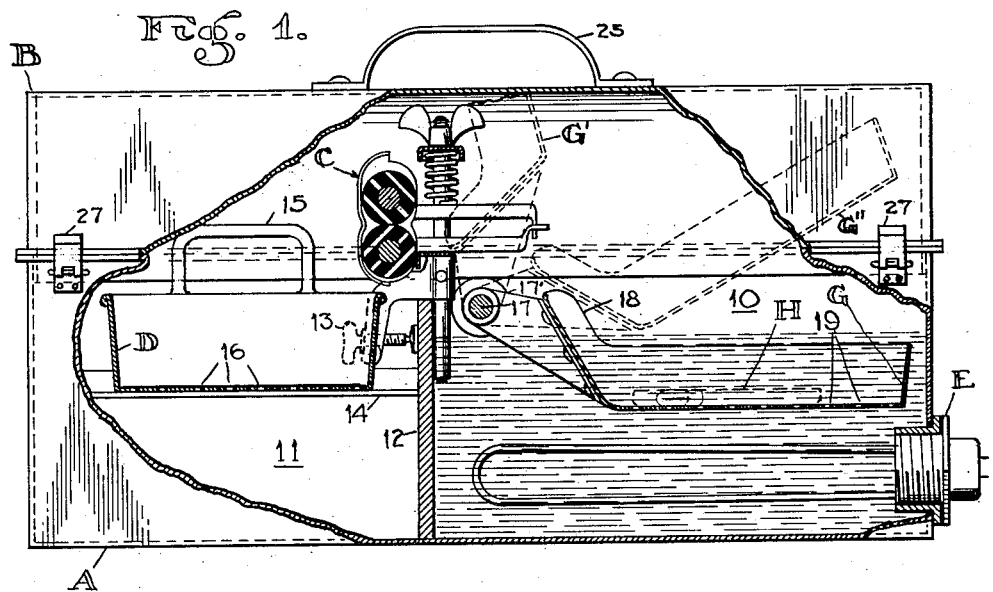
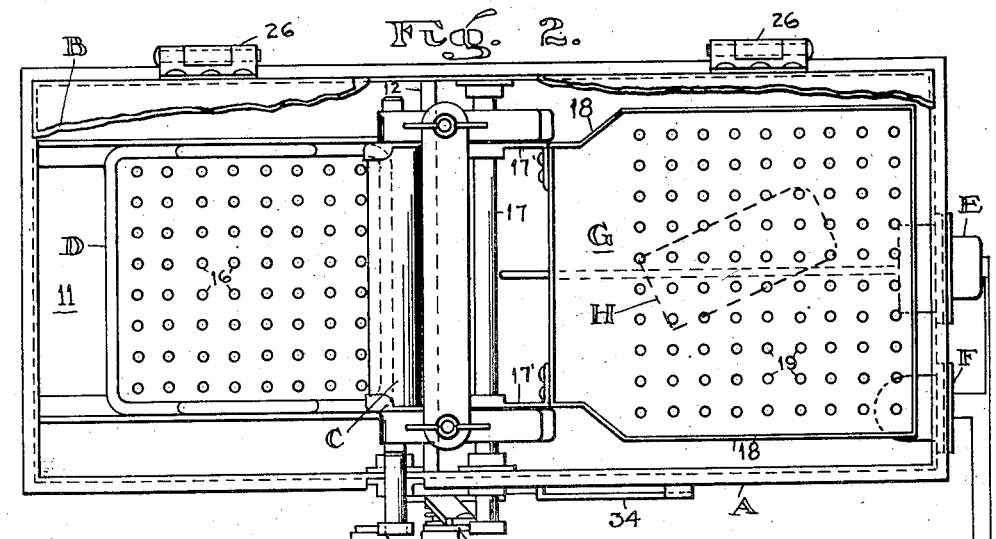
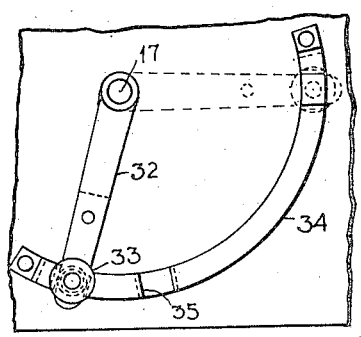
INVENTOR
EDWARD G. DOOLEY
BY R S Berry
ATTORNEY Patented May 12, 1931

1,804,752

UNITED STATES PATENT OFFICE

EDWARD G. DOOLEY, OF LOS ANGELES, CALIFORNIA, ASSIGNOR OF FORTY-NINE PER CENT TO FRANK M. HIYAKE, OF LOS ANGELES, CALIFORNIA

APPARATUS FOR HEATING AND STERILIZING TOWELS

Application filed June 13, 1928. Serial No. 285,148.

This invention relates to an apparatus for sterilizing towels and more particularly pertains to an apparatus for supplying hot towels.

An object of this invention is to furnish hot towels that have not dissipated a considerable quantity of their heat before being applied to the patient. It is a common practice to take towels from the water and wring them partially dry, while exposed to the air. My invention contemplates wringing them mechanically and retaining them in a heat chamber, until needed.

Another object is to provide towels that are thoroughly sterilized and have not been touched by hand.

Another object is the provision of hot towels that are flat and unwrinkled. The common method of wringing hot towels by forceps or other similar means leaves the towel in a twisted condition, which when unfolded presents a crumpled surface to apply to the infected part of a patient's anatomy. This is particularly undesirable when making hot applications to the eye and is at all times, an objectionable feature of the twisted hot towel.

Another object is to provide an apparatus that may be used as a steam chamber as well as for producing hot towels.

Another object being the provision of an apparatus that may be used as an instrument sterilizer.

Another object is to provide an apparatus such as described, that is small, compact and portable.

The apparatus as set forth is adapted to be used in hospitals, doctor's offices, or homes, that have need of hot sterilized towels, or in places where there is a necessity for cleansing or sterilizing instruments, cloth, gauze and other surgical or medical accessories.

The apparatus contemplates a receptacle having a hot water compartment, and a steam compartment with a suitable wringer mounted between. The water compartment is equipped with automatic heating means and has a mechanism for feeding towels directly to the wringer. The mechanism that feeds towels may also be used for submerging and raising instruments, et cetera, into and out of the hot water. The steam compartment is provided with a basket that may be detached if desired. In order to force steam into the steam compartment, I have provided a single cover for both compartments.

With the foregoing objects in view, together with such other objects and advantages as may subsequently appear, the invention, resides in the parts and in the combination, construction and arrangements of parts hereinafter described and claimed and illustrated by way of example in the accompanying drawings, in which:

Fig. 1 is a side elevation of my complete apparatus; partly broken away and shown in section;

Fig. 2 is a top plan view of the same;

Fig. 3 is a fragmentary view, showing an enlarged detail of the mechanism employed to hold the tilting tray in different positions.

Referring to the drawings more specifically, the apparatus is seen to consist of a receptacle A suitably closed by a cover B and having a suitable wringer C mounted therein. The receptacle A is divided into a hot water compartment 10 and a steam compartment 11 by means of a dividing partition 12, upon which the wringer C is clamped in place by means of clamps as shown at 13, the compartments communicating with each other through the cover B.

Suitably mounted upon angle irons 14 in the compartment 11, is a basket D equipped with a handle 15 and having a perforated bottom 16. The mechanism for feeding towels from the hot water in the compartment 10 into the wringer C consists of a tiltable tray G which is mounted upon a shaft 17 by means of brackets 17'. The tray G is provided with a marginal flange 18 and a perforated bottom as shown at 19. The purpose of this flange is to hold and guide the towel shown at H into the wringer C when the tray has been tilted into the dotted position shown at G'. The towel, perforce of gravity, will then slide down the incline of the tray and be automatically fed into the wringer while the water will drain through the perforated bottom 19. The cover B is equipped with a handle 25 suitably mounted thereon and is hinged to the receptacle A as shown at 26. During the wringing operation, the cover B would be turned back. In order to furnish a complete and portable apparatus, clamps 27 are provided on the opposite side from the hinges for locking the cover B to the receptacle A. The wringer C is provided with a handle 31 which extends outside the receptacle A and is adapted to be manually operated.

As a means of tilting the tray G, the shaft 17 is extended through one wall of the receptacle A and mounted thereon is a resilient crank 32 which is provided at its extremity with a handle 33. In order to have a means of holding the tray G in variously disposed positions of tilting, there is provided an arcuate member 34 suitably mounted on the side of the receptacle A; said member 34 has a plurality of indentations 35 adapted to receive and hold the crank 32, which by virtue of its resiliency, automatically snaps into a holding position. The means of heating the water consists of a heat element generally designated E and a thermostatically controlled switch F which is connected in series therewith.

In the operation of the invention, the towel H is placed on the tray G and allowed to become thoroughly hot by being submerged in the hot water. The tray is then tilted by means of the handle 33 and the towel is fed into the wringer where it is wrung partially dry and is then deposited in the basket D. In case the towel is not needed immediately, the cover may be closed and the towel held within the steam chamber 11 where it will not dissipate heat, but may even take on additional heat. For use as an instrument sterilizer, the instruments are placed in the tray G and allowed to sterilize, whereupon the tray is elevated to the position as shown at G″, and the instruments may be taken out for use.

The foregoing description deals specifically with the embodiment of my invention as shown by way of example in the accompany drawings.

I am aware that modifications and refinements may be made in my apparatus without departing from the scope of the specification or the spirit of the appended claims, I therefore reserve the right to such modifications.

I claim:

1. An apparatus of the character described, comprising a receptacle having a hot water compartment and a steam compartment in communication with each other, a wringer adapted to wring towels from said hot water compartment into said steam compartment, and means for feeding the towels into said wringer, said means consisting of a tray tiltably mounted in said hot water compartment and adapted to feed towels from the water into said wringer by tilting, said tray having an upstanding marginal flange with a perforated plane bottom, said plane bottom being bent at the outer end to form a substantially parallel surface to the water level when submerged.

2. An apparatus of the character described, comprising a receptacle having a hot water compartment and a steam compartment, a wringer adapted to wring towels from said hot water compartment into said steam compartment, a basket detachably mounted in said steam compartment, a communicating cover for said steam compartment and said hot water compartment, and means for mechanically feeding the towels into said wringer.

In testimony whereof, I have affixed my signature.

EDWARD G. DOOLEY.